(12) United States Patent
Solyom et al.

(10) Patent No.: US 9,731,729 B2
(45) Date of Patent: *Aug. 15, 2017

(54) VEHICLE, VEHICLE SYSTEM AND METHOD FOR INCREASING SAFETY AND/OR COMFORT DURING AUTONOMOUS DRIVING

(71) Applicant: VOLVO CAR CORPORATION, Gothenburg (SE)

(72) Inventors: Stefan Solyom, Olofstorp (SE); Erik Coelingh, Alvangen (SE); Mattias Erik Brannstrom, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 4 days.

This patent is subject to a terminal disclaimer.

(21) Appl. No.: 14/644,405

(22) Filed: Mar. 11, 2015

(65) Prior Publication Data

US 2015/0266488 A1 Sep. 24, 2015

(30) Foreign Application Priority Data

Mar. 18, 2014 (EP) .................................... 14160564

(51) Int. Cl.
*B60W 50/029* (2012.01)
*B60W 10/20* (2006.01)
(Continued)

(52) U.S. Cl.
CPC .......... *B60W 50/029* (2013.01); *B60W 10/04* (2013.01); *B60W 10/18* (2013.01);
(Continued)

(58) Field of Classification Search
CPC .............. B62D 15/0245; B60W 30/00; B60W 50/0098; B60W 50/0205; B60W 10/18;
(Continued)

(56) References Cited

U.S. PATENT DOCUMENTS 8,473,171 B2 * 6/2013 Zagorski .................. B60T 7/22
180/167
9,469,307 B2 * 10/2016 Solyom ............... B60W 50/029
(Continued)

FOREIGN PATENT DOCUMENTS

DE          10101651        7/2002
DE        102005057251      6/2007
(Continued)

OTHER PUBLICATIONS

Extended European Search Report for EP 14160564.2, Completed by the European Patent Office, Dated Sep. 10, 2014, 7 Pages.

*Primary Examiner* — Nga X Nguyen
(74) *Attorney, Agent, or Firm* — Brooks Kushman P.C.

(57) ABSTRACT

A vehicle, vehicle system and method for increasing at least one of safety and comfort during autonomous driving is provided. The vehicle system includes an autonomous drive arrangement with multiple sensors, a vehicle control arrangement and a positioning system. The vehicle system is configured to determine an estimated probability that at least one sensor will become unavailable, or an estimated time/distance ahead until at least one sensor is determined to become unavailable. The vehicle system is further configured to activate at least one countermeasure based on at least one of the estimated probability, the estimated time and the estimated distance.

15 Claims, 3 Drawing Sheets

(51) Int. Cl.
  *B60W 50/02* (2012.01)
  *B60W 10/18* (2012.01)
  *B60W 50/14* (2012.01)
  *B60W 10/04* (2006.01)

(52) U.S. Cl.
  CPC ........ *B60W 10/20* (2013.01); *B60W 50/0205* (2013.01); *B60W 50/14* (2013.01); *B60W 2050/0215* (2013.01); *B60W 2420/42* (2013.01); *B60W 2420/52* (2013.01); *B60W 2420/54* (2013.01); *B60W 2420/62* (2013.01); *B60W 2550/12* (2013.01); *B60W 2550/40* (2013.01)

(58) Field of Classification Search
  CPC .... B60W 10/20; B60W 50/029; B60W 50/14; B60W 10/04; B60W 2550/12; B60W 2550/40; B60W 2050/0215; B60W 2420/42; B60W 2420/52; B60W 2420/54; B60W 2420/62; G05D 1/024; G05D 1/0255; G05D 1/0246; G05D 2201/0213

USPC .................................. 701/36–37, 41, 51–54
  See application file for complete search history.

(56) References Cited

U.S. PATENT DOCUMENTS

| | | | |
|---|---|---|---|
| 2011/0003665 A1* | 1/2011 | Burton | G04F 10/00 |
| | | | 482/9 |
| 2012/0310466 A1 | 12/2012 | Fairfield et al. | |
| 2013/0024084 A1 | 1/2013 | Yamashiro | |
| 2013/0282236 A1* | 10/2013 | Kato | G08G 1/163 |
| | | | 701/36 |

FOREIGN PATENT DOCUMENTS

| | | |
|---|---|---|
| DE | 102007041121 | 3/2009 |
| WO | 2012097940 | 7/2012 |

\* cited by examiner

VEHICLE, VEHICLE SYSTEM AND METHOD FOR INCREASING SAFETY AND/OR COMFORT DURING AUTONOMOUS DRIVING

CROSS-REFERENCE TO RELATED APPLICATIONS

This application claims foreign priority benefits under 35 U.S.C. §119(a)-(d) to European Patent Application No. 14160564.2, filed Mar. 18, 2014, which is incorporated by reference in its entirety.

TECHNICAL FIELD

Embodiments herein relate to a vehicle system arranged to increase safety and/or comfort during autonomous driving. Embodiments herein further relate to a vehicle comprising a vehicle system arranged to increase safety and/or comfort during autonomous driving, and to a method for increasing safety and/or comfort during autonomous driving.

BACKGROUND

Some modern vehicles are equipped with one or more systems which allow the vehicle to be arranged into a semi-autonomous and/or autonomous drive mode. Such systems may include predictive safety systems, adaptive cruise control systems, lane-departure warning systems, navigation systems, communication systems and/or automatic brake control systems. Some of the systems may monitor the vehicle surroundings in order to control a host vehicle position relative a road on which the host vehicle drives, and may further determine positions and/or velocities of surrounding objects, such as other vehicles, pedestrians and various obstacles. Such systems may calculate whether a collision between the host vehicle and other vehicles or objects is imminent, and may in such case calculate an alternative route, and/or warn a driver of the host vehicle.

In order to collect information regarding the host vehicle surrounding, the host vehicle is generally equipped with various sensors that monitor the host vehicle surrounding. Such sensors may include one or more cameras, radar-units and/or lidar-units.

In addition to the sensors, a communication system in the host vehicle may be arranged to communicate with one or more external communication arrangements, such as remote servers/clouds, other vehicles and/or roadside units. The host vehicle may receive information on e.g. available routes, obstacles and traffic information via the communication arrangement.

In order to provide autonomous drive functions, the host vehicle or systems thereof depends on the information received through the sensors and/or the communication arrangement. If one or more of the sensors become unavailable, or if the communication between the host vehicle and external communication arrangements is interrupted, some or all autonomous drive functions may be disabled. A driver may then need to operate the vehicle, or some vehicle functions, manually.

If a sensor or communication-link becomes unavailable, the autonomous vehicle may be configured to stop. In some cases the driver may have to operate the vehicle manually with short notice. Both unplanned stops of the autonomous vehicle and a short preparation time for manual driving may be annoying and/or stressful for the driver.

Improvements related safety and/or comfort during autonomous driving are therefore desirable.

SUMMARY

Embodiments herein aim to provide a vehicle system arranged to increase at least one of safety and comfort during autonomous driving of a host vehicle, eliminating or at least reducing the problems and/or drawbacks associated with prior art systems.

According to an embodiment, this is provided by a vehicle system arranged to increase at least one of safety and comfort during autonomous driving of a host vehicle, the vehicle system comprising;

an autonomous drive arrangement, the autonomous drive arrangement comprising a plurality of sensors arranged to monitor at least one of a vehicle surrounding and a vehicle communication system status, a processing unit connected to at least one memory unit, arranged to store sensor data, and a control arrangement, arranged to control steering and velocity of the host vehicle based on information received from the sensors, and a positioning system, arranged to determine a host vehicle position and driving direction, wherein the vehicle system is arranged to determine, by the processing unit, at least one of the estimated probability that at least one sensor will become unavailable, and the estimated time or distance ahead until at least one sensor is determined to become unavailable, the determination being based on at least one of a, by at least one of the sensors, detected host vehicle or host vehicle surrounding condition, host vehicle surrounding condition information stored in the memory unit, and that the vehicle system further is arranged to activate, by the autonomous drive arrangement, at least one first countermeasure based on at least one of the estimated probability, the estimated time and the estimated distance.

Since the vehicle system is arranged to determine at least one of the estimated probability that at least one sensor will become unavailable, the estimated time and/or the estimated distance ahead until at least one sensor is determined to become unavailable, and further is arranged to activate at least one first countermeasure based on at least one of the estimated probability, the estimated time and the estimated distance, both safety and comfort are increased.

If the vehicle system determines that it is probable that a sensor soon will become unavailable, one or more functional countermeasures are activated. Hereby, a vehicle operator will not be forced to take control of the vehicle due to sensor unavailability, which may imply disablement of some or all autonomous drive functions.

A sensor may be considered to be unavailable if the performance of the sensor is below a threshold level. When the sensor performance is below the threshold level, input from the sensor may not be robust and/or accurate to such an extent that the sensor input may be used for the autonomous drive functions.

Due to the determination of upcoming sensor unavailability the vehicle operator may be alerted before the control arrangement is affected of the reduced sensor input, such that he/she may control some or all drive functions manually, or other sensors may compensate for the unavailable sensor. In addition, other drive and/or safety systems may be activated as a countermeasure to the determined sensor unavailability.

The vehicle system may be configured to, very quickly, determine upcoming sensor unavailability. If, for example, an oncoming vehicle drives in a puddle, water may splash up against the host vehicle. Sensors in/on the host vehicle may then be blocked by the water. When the sensors detect that water splash is approaching the host vehicle, the vehicle system may determine that one or more of the sensors will become unavailable for a short while, e.g. until the water has, at least partly, disappeared from the one or more sensors. If the oncoming vehicle drives near an intended/ expected host vehicle travelling trajectory and there are puddles on the road between the oncoming vehicle and the host vehicle, the vehicle system may estimate the probability that one or more sensors become unavailable to be high, such as 50-100%. Similarly, if puddles on the road are large or if the road comprises many puddles, the vehicle system may determine that it is likely that one or more sensors will become unavailable.

The vehicle system may further determine the estimated distance until at least one sensor will become unavailable. If one or more sensor detects a large puddle 50 meters ahead of the host vehicle, it may determine that the estimated probability for sensor unavailability e.g. 50-60 meters ahead is high.

The vehicle system may further determine the estimated time until at least one sensor will become unavailable. If one or more sensor detects a large puddle 50 meters ahead of the host vehicle, it may determine that the estimated probability for sensor unavailability e.g. 50-60 meters ahead is high. The host vehicle system may further receive information of the host vehicle velocity, e.g. via a sensor, or via communication with other vehicle systems. If the vehicle system comprise information e.g. on a current host vehicle velocity of 25 m/s, it may determine that it is likely that sensor unavailability may occur in approximately 2 seconds.

Thus, hereby is provided a vehicle system which is arranged to increase at least one of safety and comfort during autonomous driving, eliminating or at least reducing the problems and/or drawbacks associated with prior art solutions.

According to some embodiments, the vehicle system is arranged to activate, by the autonomous drive arrangement, at least one first countermeasure if the estimated probability that at least one sensor will become unavailable exceeds a threshold probability or if the estimated time or distance ahead until at least one sensor is determined to become unavailable is below a threshold level.

Since the vehicle system is arranged to activate at least one first countermeasure if the estimated probability that at least one sensor will become unavailable exceeds a threshold probability or if the estimated time or distance ahead until at least one sensor is determined to become unavailable is below a threshold level, the vehicle system is capable to deal with a number of possible scenarios. If it is determined that the probability for sensor unavailability exceeds a predetermined threshold value, a countermeasure is activated. The threshold probability may be a calculated value, above which the likelihood for possible dangerous scenarios is increased. The threshold probability may be input into the vehicle system in advance.

Alternatively, or in addition to, the estimated probability that at least one sensor will become unavailable, one or more countermeasures is activated if the estimated time or distance ahead, until at least one sensor is determined to become unavailable, is below a threshold level. When a sensor is determined to become unavailable, also the time and/or distance is calculated for when/where the sensor temporarily will terminate to function properly. If the amount of time/distance until the determined sensor unavailability is less than a threshold limit, at least one countermeasure is activated. The threshold limit may be indicative of a number of milliseconds, seconds or meters.

According to some embodiments, the plurality of sensors is arranged to provide detected information on the host vehicle surrounding to the memory unit, such that detected vehicle surrounding information on routes driven by the host vehicle is accessible during subsequent drive on the same routes.

Since vehicle surrounding information on routes driven by the host vehicle is saved to the memory unit and accessible during subsequent drive on the same routes, the vehicle system can learn when upcoming sensor unavailability is expected or likely. Hence, a library over sensor capacity for different vehicle surroundings, e.g. with respect to different time of the day, is built up. Vehicle surrounding information may relate e.g. to light, weather and/or temperature conditions, to traffic information, information on road sections or any other information on conditions prevailing around the host vehicle during driving.

According to some embodiments the activation of at least one countermeasure is based on a, by at least one of the sensors, detected host vehicle surrounding condition in form of sun-light, negatively affecting a vehicle camera sensor.

Since at least one countermeasure is activated when it is determined that sun-light will negatively affect a vehicle camera sensor, the countermeasure is activated before sunshine hits e.g. a camera lens and saturate the camera sensor. Due to this activation the vehicle operator may be alerted in advance in situations when it is likely that a sensor functionality will decrease because of sunlight.

According to some embodiments the activation of at least one countermeasure is based on host vehicle surrounding condition information stored in the memory unit, the information being related to a sun position.

Since the activation of at least one countermeasure is based on information being related to a sun position, one or more countermeasures is activated when the sun is in a position where it is likely that at least one sensor will become unavailable. For example, during dusks and dawns, the sun is near the horizon and may shine into a camera lens.

According to some embodiments the activation of at least one countermeasure is based on stored information related to a sun position combined with information on the host vehicle driving direction, received from the positioning system.

Since the activation of at least one countermeasure is based on stored information related to a sun position, combined with information on the host vehicle driving direction received from the positioning system, a countermeasure is activated if it is determined that the sun is in a, for a sensor capacity, critical position and that the vehicle is driving in a direction wherein the critical sun position will affect the sensor capacity.

For example, if the host vehicle is steered in a direction towards a setting sun, the vehicle system determines that the probability that a camera sensor will become unavailable is increased. The vehicle system then activates one or more countermeasures to the expected sensor unavailability. The countermeasure may be e.g. to warn the vehicle operator about the expected state of the sensor, to alert the vehicle operator of autonomous drive function disablement and/or to suggest a route where better light conditions are expected.

According to some embodiments the activation of at least one countermeasure is based on a, by at least one of the sensors, detected host vehicle surrounding condition in form of a weather condition, negatively affecting at least one of a camera sensor, a radar sensor and a lidar sensor.

Since the activation of at least one countermeasure is based on a weather condition, negatively affecting at least one of a camera sensor, a radar sensor and a lidar sensor, a countermeasure can be activated e.g. when heavy rain, snow or fog is expected to decrease sensor capacity. For example, humidity may affect a camera sensor, snow may affect a radar-sensor and ice-crystals in the air may affect a lidar-sensor.

According to some embodiments the vehicle system further comprises a communication system arranged for communication between the host vehicle and external communication arrangements, and the host vehicle is arranged to receive data relating to host vehicle surrounding conditions from the external communication arrangements.

Since the host vehicle is arranged to receive data relating to host vehicle surrounding conditions from external communication arrangements, systems and/or persons in the host vehicle may be informed of upcoming situations wherein sensor capacity may be limited. The situations may be related to map information, road geometry/inclination/sloping, and/or obstacles such as buildings, crests and trees in the vicinity of the road. The host vehicle surrounding conditions received by the host vehicle may also relate to e.g. a sun position, possibly expressed as a mathematical formula.

External communication arrangements may be communication arrangements in other vehicles, roadside units or other roadside infrastructure with communication capacity, remote servers/"the cloud".

According to some embodiments the vehicle system further comprises a navigation system arranged to provide the autonomous drive arrangement with information on available routes in a road network surrounding the host vehicle and to allow a vehicle operator to input a preferred route.

Since the vehicle system further comprises a navigation system, wherein the vehicle operator can input a preferred route, the vehicle system may suggest alternative routes to a preferred route, if it is determined that the preferred route is associated with sensor unavailability. Hereby the vehicle system may provide autonomous drive functions along the alternative route, along which the sensors will function properly.

According to some embodiments the activation of at least one countermeasure is based on a, by at least one of the sensors, detected decreased communication capacity between the host vehicle and at least one external communication arrangement.

Since the activation of at least one countermeasure is based on a detected decreased communication capacity between the host vehicle and at least one external communication arrangement, the vehicle system may e.g. alert a vehicle operator of the decreased communication capacity. For example, if a GPS-signal is blocked when the host vehicle enters a tunnel, some autonomous drive functions may be disabled. The vehicle system may then indicate to the vehicle operator that he/she needs to operate the vehicle manually through the tunnel.

According to some embodiments the activation of at least one countermeasure is based on a host vehicle surrounding condition information indicative of a communication capacity in a predefined geographical area.

Since the activation of at least one countermeasure is based on a host vehicle surrounding condition information indicative of a communication capacity in a predefined geographical area the vehicle system may e.g. alert a vehicle operator. For example, if a communication capacity in an upcoming area is reduced, some autonomous drive functions may be disabled. The vehicle system may then indicate to the vehicle operator that he/she needs to operate the vehicle manually through that area. The information may be stored in the memory unit or sent to the host vehicle. The information may relate to any kind of communication capacity, such as radio-signals, electrical signals and/or electromagnetic wave signals. A communication capacity may decrease e.g. due to package loss and/or decreased signal strength. The decreased communication capacity in the geographical area may relate to e.g. the terrain, the distance to external communication arrangements and/or the number of vehicles in the area.

According to some embodiments a sensor is determined to be unavailable if a sensor performance level is below a threshold sensor performance level, and in that at least one first countermeasure is activated only if the sensor is determined to be unavailable for a duration of time that exceeds a threshold duration of time.

Since the sensor is determined to be unavailable if a sensor performance level is below a threshold sensor performance level, and in that at least one first countermeasure is activated only if the sensor is determined to be unavailable for a duration of time that exceeds a threshold duration of time, the vehicle system is arranged to provide autonomous drive functions for shorter periods of sensor unavailability.

A threshold duration of time may be dependent on factors such as the vehicle speed, road type, traffic intensity around the host vehicle etc. During the sensor unavailability the control arrangement is arranged to control steering and velocity of the host vehicle based on dead reckoning, i.e. by sensor data gathered just before the sensor unavailability. In some cases some sensor data may be used also when the sensor performance is degraded.

If some sensors are determined to became unavailable due to water splash from a puddle, the processing unit may determine that sensor unavailability will occur for 1.5 seconds. If a threshold duration of time is e.g. 3 seconds, the countermeasure(s) will not be activated. If the threshold duration of time is e.g. 1 second, at least one countermeasure will be activated.

According to some embodiments the vehicle system is arranged to activate the at least first countermeasure, the countermeasure being selected from the group of: a host vehicle operator alert, indicative of an upcoming reduced autonomous driving capacity, a disablement of one or more autonomous drive functions, a generation of an alternatively route to a previously selected preferred route, an increase safety distance to at least one object in the vehicle surrounding, a change of vehicle velocity, activation of dead reckoning and a stop of the vehicle.

The at least one first countermeasure may be selected based on factors such as the vehicle speed, road type, traffic intensity around the host vehicle etc. For example, if a sensor unavailability period is determined to occur at a distance relatively far ahead of the host vehicle, a first countermeasure may be to generate or suggest an alternative route, on which autonomous driving is expected to function properly. If a sensor unavailability is determined to occur within a relatively short time or distance, a vehicle operator may be alerted. In a traffic situation with other vehicles near the host vehicle, a first countermeasure may be to increase a safety distance to one or more of the surrounding vehicles. A first countermeasure may also be to increase a safety distance to other objects in the vehicle surrounding, such as road users, pedestrians etc. The at least one first countermeasure may also be selected based on the type of sensor which is determined to become unavailable.

According to some embodiments the vehicle system is arranged to activate two or more countermeasures. The plurality of countermeasures may be selected from the group of: a host vehicle operator alert, indicative of an upcoming reduced autonomous driving capacity, a disablement of one or more autonomous drive functions, a generation of an alternative route to a previously selected preferred route, an increased safety distance to at least one object in the vehicle surrounding, a change of vehicle velocity, activation of dead reckoning and stopping the vehicle.

Any combination of countermeasures may, depending on the determined sensor unavailability and factors in the host vehicle surrounding, be activated. In some situations e.g. an alert and an increased safety distance may be suitable. In some situations sensor-information from a first sensor, which is determined to soon be unavailable, may instead be received via other sensors.

Thus, hereby is provided a vehicle system, eliminating or at least reducing the problems and/or drawbacks associated with prior art systems.

Embodiments herein also aim to provide a vehicle comprising a vehicle system arranged to increase at least one of safety and comfort during autonomous driving of a host vehicle, without the problems or drawbacks described above.

According to some embodiments, this is provided by a vehicle, wherein the vehicle comprises a vehicle system according to embodiments herein.

Thus, hereby is provided a vehicle, eliminating or at least reducing the problems and/or drawbacks associated with prior art vehicles.

Embodiments herein also aim to provide a method for increasing at least one of safety and comfort during autonomous driving of a host vehicle without the problems or drawbacks described above.

According to some embodiments, this is provided by a method for increasing at least one of safety and comfort during autonomous driving of a host vehicle, where the host vehicle comprises a vehicle system comprising; an autonomous drive arrangement, the autonomous drive arrangement comprising a plurality of sensors arranged to monitor at least one of a vehicle surrounding and a vehicle communication system status, a processing unit connected to at least one memory unit, arranged to store sensor data, a control arrangement, arranged to control steering and velocity of the host vehicle based on information received from the sensors, and a positioning system, arranged to determine a host vehicle position and driving direction, wherein that the method comprises;

determining, by the processing unit, at least one of the estimated probability that at least one sensor will become unavailable and the estimated time or distance ahead until at least one sensor is determined to become unavailable, the determination being based on at least one of a, by at least one of the sensors, detected host vehicle or host vehicle surrounding condition and information on a host vehicle surrounding condition stored in the memory unit, activating, by the autonomous drive arrangement, at least one first countermeasure based on at least one of the estimated probability, the estimated time and the estimated distance.

Since at least one first countermeasure is activated based on a determined sensor unavailability, both safety and comfort during the autonomous driving of the host vehicle is achieved.

Thus, hereby is provided a method for increasing at least one of safety and comfort during autonomous driving of a host vehicle, eliminating or at least reducing the problems and/or drawbacks associated with prior art methods.

Further features of, and advantages with, the embodiments herein will become apparent when studying the appended claims and the following detailed description. Those skilled in the art will realize that different features of the embodiments herein may be combined to create embodiments other than those described in the following, without departing from the scope of the appended claims.

BRIEF DESCRIPTION OF THE DRAWINGS

Various aspects of embodiments herein, including its particular features and advantages, will be readily understood from the following detailed description and the accompanying drawings, in which.

DETAILED DESCRIPTION

As required, detailed embodiments are disclosed herein. However, it is to be understood that the disclosed embodiments are merely exemplary and embodiments may take various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Embodiments herein will now be described more fully with reference to the accompanying drawings, in which example embodiments are shown. However, this application should not be construed as limited to the embodiments set forth herein. Disclosed features of example embodiments may be combined as readily understood by one of ordinary skill in the art to which this application belongs. Like numbers refer to like elements throughout.

Well-known functions or constructions will not necessarily be described in detail for brevity and/or clarity.

Figure 1A:
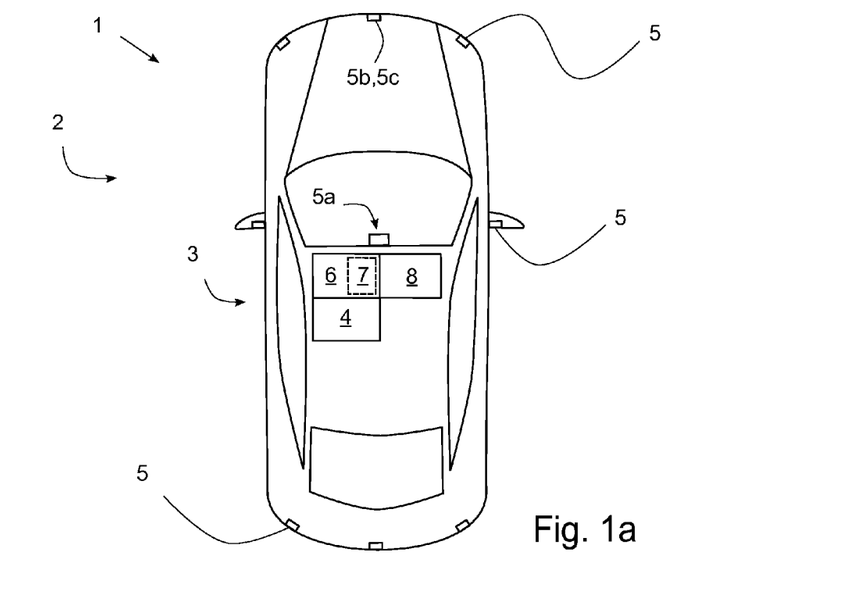
FIG. 1a illustrates a vehicle having a vehicle system according to some embodiments herein.

FIG. 1a illustrates a host vehicle 1, arranged for autonomous driving. The host vehicle 1 may be any vehicle, such as a car, a bus or a truck, which is capable of driving autonomously on a road.

The host vehicle 1 comprises a vehicle system 2, which is arranged to increase safety and/or comfort during autonomous driving of the host vehicle 1. The vehicle system 2 comprises an autonomous drive arrangement 3 and a positioning system 4.

The autonomous drive arrangement 3 comprises a plurality of sensors 5, arranged to monitor a vehicle surrounding. The sensors 5 may be one or more camera sensors 5a, one or more radar sensors 5b and/or one or more lidar-sensors 5c. As illustrated in FIG. 1a, sensors 5 may be arranged at any position in/on the host vehicle 1 from where detection of an interior or exterior condition is possible. Sensors 5 may for example be arranged at a vehicle front-, side and/or rear portion, at a vehicle grille, bumpers, rear-view-mirrors and/ or a windshield. Some sensors 5 may be arranged in or near a vehicle compartment, chassis, motor, drivetrain and/or wheels. The sensor 5 position may depend on the type of sensor. For example, a camera sensor 5a and/or a lidar sensor 5c may be arranged at the inside of the windshield, while one or more radar sensors 5b may be arranged in the grille and/or bumpers.

A camera sensor 5a may be e.g. a front- or rear facing digital camera equipped with or connected to one or more processors with object recognition logics. Hereby surrounding objects, such as road lanes, other vehicles, traffic signs, pedestrians, animals, different obstacles etc. may be detected and in some cases, identified/classified. Radar sensors 5b may include transmitters that emit signals that bounces back from object around the host vehicle, and receivers that receive the returned signals. The radar sensors 5b may include e.g. ultra wide band radars, narrow band radars and/or multi node radars. Lidar-sensors 5c may measure distances to objects by illuminating the objects with a laser and analyzing the reflected light. Other types of sensors 5 used to monitor the vehicle surrounding may be e.g. ultrasonic sensors and/or infrared sensors.

Some sensors 5 may be arranged to detect a vehicle communication system status. Such sensors may determine signal strength/accessibility for signals between a communication system in the host vehicle 1 and external communication arrangements. If a signal gets weaker, such that the communication decreases or fails, the sensors 5 may provide the autonomous drive arrangement 3 with information hereof. A communication system status may decrease e.g. due to package loss and/or an decreased signal strength. The signals may relate e.g. to mobile or mobile-data signals (such as GSM 3G, 4G, LTE, 5G) or any satellite and/or global positioning system signals (such as GPS, Galileo, GLONASS).

As illustrated in FIG. 1a, the autonomous drive arrangement 3 comprises at least one processing unit 6 connected to at least one memory unit 7, arranged to store sensor data. In some embodiments the one or more processing units 6 are used for processing in several different vehicle systems. Some processing units 6 may be dedicated to a specific processing task. In some embodiments the host vehicle 1 and/or the vehicle system 2 may comprise a large number of processing units 6. The one or more processing units 6 may be central processing units, CPUs, also referred to as central processor units, that carries out instructions of computer programs/software, which, when executed perform basic arithmetical, logical, and input/output operations. The vehicle system 2 may also comprise an accelerated processing unit, APU, also referred to as an advanced processing unit. An APU is a processing unit that includes additional processing capability designed to accelerate one or more types of computations outside of the CPU. One or more processing units 6 may comprise application programming interfaces, APIs, which specify how software components may interact with each other.

The one or more processing units 6 comprise and/or are connected to one or more memory units 7. The one or more memory units 7 may be arranged in the host vehicle 1 and/or outside of the host vehicle 1. In some embodiments, the one or more processing units 6 may save information to the so called cloud, e.g. memory units 6 arranged in remote servers.

The autonomous drive arrangement 3 further comprises an electrical/mechanical control arrangement 8, arranged to control steering and velocity of the host vehicle 1 based on information received from the sensors 5. The control arrangement 8 is connected to a vehicle steering system, such that the control arrangement 8, directly or indirectly, may control a direction of at least some of the wheels of the host vehicle 1. Hereby e.g. a yaw rate of the host vehicle 1 may be adjusted, such that the driving direction of the host vehicle 1 is adjusted in accordance with the input from the control arrangement 8. The control arrangement 8 is also connected to a vehicle engine and a vehicle braking system, such that the control arrangement 8, directly or indirectly, may control acceleration and/or deceleration of the host vehicle 1. The control arrangement 8 may e.g. increase a vehicle velocity by increasing the engine speed, and decrease the vehicle velocity by motor-braking or by activation of one or more wheel brakes. The control arrangement 8 may e.g. be connected to an ABS (anti-lock braking system), such that one or more wheel brakes may be activated selectively.

As illustrated in FIG. 1a, the vehicle system 2 comprises a positioning system 4, arranged to determine a host vehicle position and driving direction/heading. The positioning system 4 may determine the host vehicle position and driving direction e.g. via a satellite based global positioning system and/or matching relatively a map. A compass may be used for determination of a vehicle direction. The positioning system 4 may comprise or be connected to a navigation system.

The processing unit 6 is arranged to determine an estimated probability that at least one sensor 5 will become unavailable and/or an estimated time to or distance ahead until at least one sensor 5 is determined to become unavailable. The probability that at least one of the sensors 5 will become unavailable within a certain time amount or within a certain distance ahead of the host vehicle 1 is based on a host vehicle 1 or host vehicle surrounding condition, detected by one or more sensors 5, and/or host vehicle surrounding condition information, previously detected and stored in the memory unit 7. The vehicle system 2 is further arranged to activate, by the autonomous drive arrangement, at least one first countermeasure, based on the estimated probability and/or the estimated time and/or the estimated distance.

According to some embodiments a sensor is determined to be unavailable if a sensor performance level is below a threshold sensor performance level, and in that at least one first countermeasure is activated only if the sensor is determined to be unavailable for a duration of time that exceeds a threshold duration of time. The duration of time may depend e.g. on host vehicle surrounding conditions, host vehicle velocity, traffic intensity. According to some embodiments, the threshold duration of time may be one or a few seconds, such as 1-15 s. According to some embodiments, the threshold duration of time may be about 3 s.

Figure 1B:
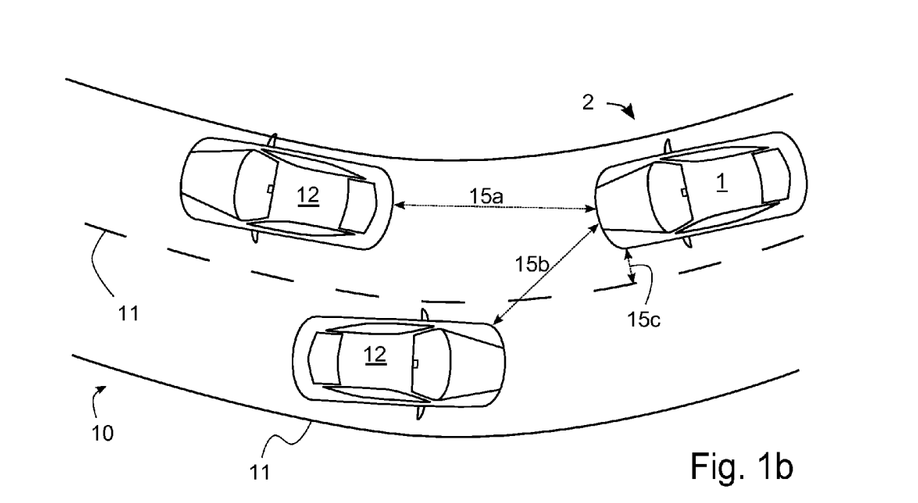
FIG. 1b illustrates a vehicle having a vehicle system according to some embodiments herein and surrounding vehicles on a road.

FIG. 1b illustrates the host vehicle 1 and the vehicle system 2 as seen from above. During autonomous driving, the sensors arranged in/on the host vehicle 1 are arranged to continuously monitor the host vehicle surrounding along a road 10, on which the host vehicle 1 is travelling. The sensors thus gather the type of information that a vehicle operator normally perceives through his/her senses during manual or semi-manual driving. The information may relate to any factor which may affect a current or upcoming traffic situation. The detected information may e.g. relate to road direction, road surface, road friction, road lanes, surrounding climate and weather conditions, light conditions, other vehicles, objects, pedestrian, bicyclists, animals etc. on or in the vicinity of the road, nearby buildings or obstacles, traffic intensity, general traffic information, upcoming crossings etc.

The information detected via the sensors is used as input to the host vehicle control arrangement. The control arrangement may be configured to control the steering and velocity of the host vehicle 1 in a manner that an attentive and experienced driver would have done in a similar situation, i.e. to follow a traffic rhythm and avoid potentially dangerous situations. For example, if sensors detect that a distance 15a to a slower driving vehicle 12 ahead of the host vehicle 1 decreases below a predefined safety distance, or with a closing velocity above a threshold velocity, the vehicle system 2 may be configured to apply the brakes of the host vehicle 1. If a distance 15b, 15c to surrounding vehicles 12 becomes too small, the host vehicle 1 may adjust its lateral position, such that the distance 15b, 15c is increased. The vehicle system 2 may be configured to increase the safety margins to other vehicles more in higher speeds, and may adjust brake forces and yaw rates e.g. in accordance with detected ice or other slippery surfaces on the road 10.

The vehicle system 2 is dependent on robust sensor information in order to provide autonomous driving functionality. If one or more sensors becomes defect, blocked or in any other way unavailable to detect the host vehicle surroundings and/or a vehicle communication system status, the host vehicle operator may have to take control over the vehicle until the sensor or sensors functions properly again. In order to avoid that the vehicle operator will have to take control of the host vehicle 1, if one or more sensors become unavailable, the processing unit is arranged to determine the estimated probability that at least one sensor will become unavailable and/or the estimated time or distance ahead until at least one sensor is determined to become unavailable. The probability that at least one of the sensors will become unavailable, within a certain amount of time or within a certain distance ahead of the host vehicle 1, is based on a detected host vehicle or host vehicle surrounding condition, detected by one or more sensors, and/or host vehicle surrounding condition information stored in the memory unit. The vehicle system 2 is further arranged to activate at least one first countermeasure, based on the estimated probability and/or the estimated time and/or the estimated distance.

Figure 2A:
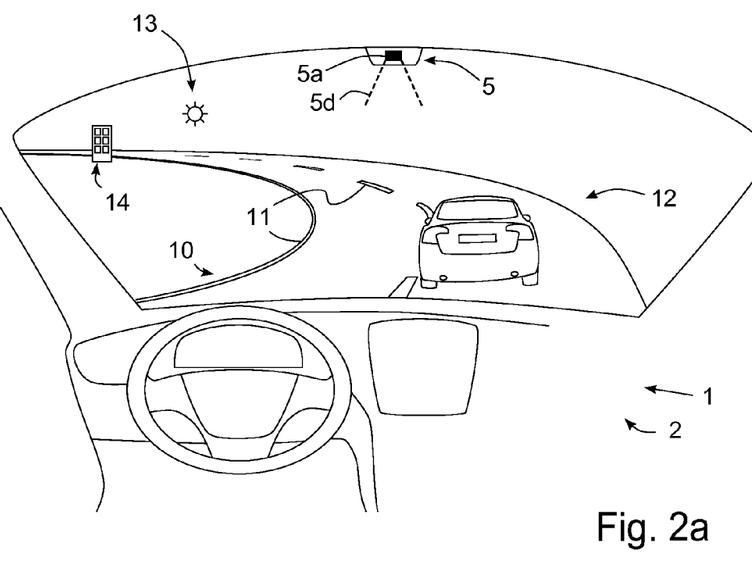
FIG. 2a illustrates a vehicle having a vehicle system according to some further embodiments herein.

In FIG. 2a the host vehicle 1 is illustrated in a road environment. The host vehicle 1 is depicted when driving on a road 10 provided with road markings 11. Ahead of the host vehicle 10 a surrounding vehicle 12 is illustrated.

The host vehicle 1 comprises the vehicle system 2, which allows the host vehicle 1 to drive autonomously. The host vehicle 1 may therefore be referred to as an autonomous vehicle, in which many or all of vehicle operator tasks, such as steering, accelerating and braking are performed automatically by the vehicle system 2. The vehicle operator may instead focus on secondary tasks, such as reading, socializing or browsing the internet, instead of the otherwise primary task of driving the vehicle. The vehicle system 2 may comprise and/or be connected to a number of co-operating subsystems, such as adaptive cruise control systems, lane departure control systems, collision avoidance system, traffic sign recognition systems, communication systems, navigation systems, ultrasonic sensor systems, infrared camera systems, inertial measuring systems, intelligent transportation systems, safe road train systems, automatic parking systems etc.

According to some embodiments, the activation of at least one countermeasure is based on a, by at least one of the sensors 5, detected host vehicle surrounding condition in form of sun-light, negatively affecting a vehicle camera sensor 5a. This scenario is depicted in FIG. 2a. When the host vehicle 1 autonomously drives in a direction where a longitudinal direction of the host vehicle 1, or a monitoring field direction 5d of the camera sensor 5a, is larger than a predetermined angle relative to the sun 13, the camera sensor 5a is determined to be available. When the host vehicle 1 continues along the road 10 in FIG. 2a, the angle relative to the sun 13 will decrease. When the longitudinal direction of the host vehicle 1 or the monitoring field direction 5d of the camera sensor 5a is equal or less than the predetermined angle to the sun 13, the risk that the sun 13 shines straight into the lens of the camera sensor 5a is high. The lens may become saturated, whereby the sensor 5a may fail to provide sensor information on the host vehicle surrounding to the control arrangement 8. If the sensor 5a fails to provide sensor information on the host vehicle surrounding to the control arrangement 8, the sensor 5 is determined to be unavailable. The vehicle system 2 may use information on an upcoming road direction, a selected route and/or historical data for the determination of the time and/or distance until the sensor is determined to become unavailable.

Since expected upcoming sensor unavailability is determined before the sensor 5 actually becomes unavailable, one or more countermeasures to the determined sensor unavailability may be activated. In the FIG. 2a-illustration, where the host vehicle driving direction approaches the sun 13, such a determination may be based on factors such as the luminous intensity of the sun 13 and the vertical and/or horizontal distance between the host vehicle driving direction and the position of the sun. The relationship may be expressed e.g. as a mathematical formula. Upcoming curves and crests, clouds, houses, trees, particles in the atmosphere etc. may be taken into account for the determination. The determination may also be based on the present time of the day, the geographical position of the host vehicle etc. For example, a sensor may be determined to be unavailable if a probability that the sensor will stop to function properly is higher than a pre-defined probability, According to some embodiments such probability may be between 50-99%, such as 60%, 70%, 80% or 90%.

The vehicle system 2 may be arranged to activate, by the autonomous drive arrangement 3, at least one first countermeasure if the estimated probability that at least one sensor will become unavailable exceeds a threshold probability or if the estimated time or distance ahead, until at least one sensor is determined to become unavailable, is below a threshold level. Different threshold levels may be selected, e.g. depending on which level of safety that is required, and if information from available sensors may compensate for the determined sensor unavailability.

According to some embodiments, the plurality of sensors 5 may be arranged to provide detected information on the host vehicle surrounding to the memory unit 7, such that detected vehicle surrounding information on routes driven by the host vehicle 1 is accessible during subsequent drive along the same routes.

As mentioned above, several types of sensors 5 may be used to monitor the host vehicle surroundings. According to some embodiments, the activation of at least one countermeasure may be based on a, by at least one of the sensors, detected host vehicle surrounding condition in form of a weather condition, negatively affecting at least one of a camera sensor, a radar sensor and a lidar sensor.

In some situations, a sensor 5 may be unavailable due to obstacles near the road 10. In FIG. 2a the vehicle system 2 may determine that e.g. a camera sensor 5a will be at least temporarily unavailable if e.g. a building 14 blocks a part of or the entire monitoring field 5d. A sensor 5 may also be determined to be unavailable due to a curve or a crest. A radar sensor 5b may not be able to detect relevant areas of the host vehicle surrounding if its field of view is blocked by obstacles. Radar sensors 5b may also be blocked e.g. due to rain, snow and water spray from surrounding vehicles. During certain temperature and/or humidity conditions, moisture on the inside of the windshield may be predicted in advance, e.g. from communicated weather forecasts. A sensor may be determined to be unavailable during such conditions.

Figure 2B:
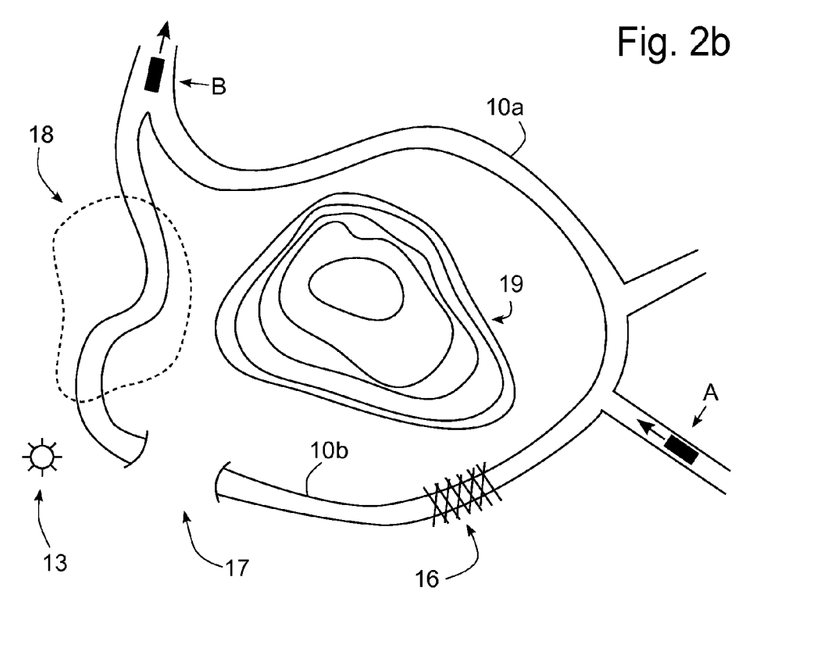
FIG. 2b illustrates a vehicle having a vehicle system according to some embodiments herein driving from a point A to a point B on a road.

In FIG. 2b the host vehicle 1 is illustrated on a road in a road network 10a, 10b. In this illustrated embodiment the host vehicle 1 is about to autonomously drive from point A to point B. According to some embodiments the vehicle system 2 comprises a communication system arranged for communication between the host vehicle 1 and external communication arrangements. The host vehicle 1 may then be arranged to receive data relating to host vehicle surrounding conditions from the external communication arrangements. According to some embodiments, the vehicle system 2 further comprises a navigation system arranged to provide the autonomous drive arrangement with information on the available routes 10a, 10b of the road network surrounding the host vehicle 1 and to allow a vehicle operator to input a preferred route. The navigation system may be connected to the abovementioned positioning system 4.

Due to the detected and/or received information, or due to information detected and saved during previously driven routes along the routes 10a, 10b, the vehicle system 2 may be aware of the expected conditions prevailing along the routes. If a camera sensor during previously driven routes became unavailable due to a particular sun position at a particular time of the day, this information may be used to activate a countermeasure to the unavailability during later trips along the same route.

A few examples are given with reference to FIG. 2b. A vehicle operator may like to autonomously travel from point A to point B. If the vehicle system 2 determines that sensor unavailability is likely to occur during route 10b, which may make autonomous driving impossible, it may select, or recommend the driver to instead select route 10a.

Obstacles, sharp curves and/or crests, weather forecasts, information on road construction sites, accident sites etc. may be communicated as map data to the host vehicle 1. Some information may be detected by the host vehicle sensors 5 before they are determined to be unavailable.

Examples of surrounding conditions which may negatively affect a sensor 5 are given in the following. Diffuse lane markers 16 may negatively affect a camera sensor. A tunnel 17 may negatively affect a GPS-signal-sensor. The sun 13 may negatively affect a camera sensor. In a predefined or delimited geographical area 18 a communication capacity may be insufficient, which may negatively affect a signal between the host vehicle 1 and external communication arrangements, such as servers, roadside units, surrounding vehicles and/or intelligent traffic systems.

Thus, according to some embodiments, the activation of at least one countermeasure is based on host vehicle surrounding condition information, indicative of a communication capacity in the predefined geographical area 18. Hence, a countermeasure may be activated e.g. if a data signal or positioning signal becomes weaker. This may be the case e.g. if the host vehicle 1 is far from a telecommunication-mast, or if a signal is blocked e.g. by the illustrated mountain 19.

As mentioned above, one or more countermeasures may be activated when a sensor is determined to become unavailable. For example, two, three, four or five different countermeasures may be activated. The one or more countermeasures may include: activation of a host vehicle operator alert, indicative of an upcoming reduced autonomous driving capacity, disablement of one or more autonomous drive functions, generation of an alternative route to a previously selected preferred route. In FIG. 2b, the vehicle system may generate the route 10a instead of route 10b if it is determined that route 10b may render autonomous driving impossible.

A countermeasure may also be: an increase safety distance between the host vehicle 1 and at least one object in the host vehicle surrounding, a change of vehicle velocity, stopping the vehicle or a lateral displacement. A countermeasure may also be dead reckoning. Dead reckoning is a process for estimating a value (e.g. indicative of a velocity and/or a position) based on earlier values, together with occurring changes. If a sensor becomes unavailable, dead reckoning may be used to continue to control the vehicle along a path determined when sensors were available. Hence, historically gathered data may be used for shorter periods of time until sensor information is available again.

Figure 3:
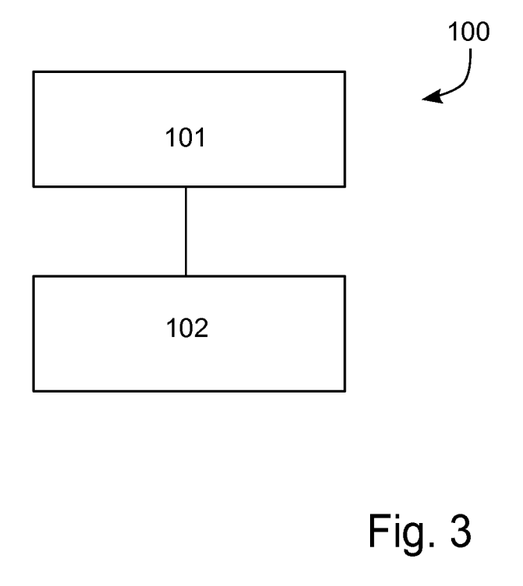
FIG. 3 illustrates a method according to embodiments herein.

FIG. 3 illustrates a method 100 for increasing at least one of safety and comfort during autonomous driving of a host vehicle, where the host vehicle comprises a vehicle system with: an autonomous drive arrangement, the autonomous drive arrangement comprising a plurality of sensors arranged to monitor at least one of a vehicle surrounding and a vehicle communication system status, a processing unit connected to at least one memory unit, arranged to store sensor data, a control arrangement, arranged to control steering and velocity of the host vehicle based on information received from the sensors.

The autonomous drive arrangement also comprises a positioning system, arranged to determine a host vehicle position and driving direction.

The method 100 comprises the steps of determining 101, by the processing unit, at least one of the estimated probability that at least one sensor will become unavailable and the estimated time or distance ahead until at least one sensor is determined to become unavailable. The determination is based on at least one of a, by at least one of the sensors, detected host vehicle or host vehicle surrounding condition and a host vehicle surrounding condition information stored in the memory unit, and activating 102, by the autonomous drive arrangement, at least one first countermeasure based on at least one of the estimated probability, the estimated time and the estimated distance.

If the determination of sensor unavailability is based on a, by at least one of the sensors, detected host vehicle surrounding condition, the time/distance may be small. For example, if water splash from a surrounding vehicle is detected, the time until the sensor is determined to be unavailable may be e.g. a few milliseconds or a few seconds. If a sunset ahead is detected, the time until the sensor is determined to be unavailable may be e.g. a few seconds or a few minutes. If the host vehicle surrounding condition is stored in the memory unit, the time until the sensor is determined to be unavailable may be longer, such as minutes or hours ahead.

Although aspects have been described with reference to example embodiments, many different alterations, modifications and the like will become apparent for those skilled in the art. Therefore, it is to be understood that the foregoing is illustrative of various example embodiments and the scope of the appended claims is not to be limited to the specific embodiments disclosed and that modifications to the disclosed embodiments, combinations of features of disclosed embodiments as well as other embodiments are intended to be included within the scope of the appended claims.

As used herein, the term "comprising" or "comprises" is open-ended, and includes one or more stated features, elements, steps, components or functions but does not preclude the presence or addition of one or more other features, elements, steps, components, functions or groups thereof.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. A vehicle system configured to increase at least one of safety and comfort during autonomous driving of a host vehicle, the vehicle system comprising:
    an autonomous drive arrangement comprising
        a plurality of sensors configured to monitor at least one of a vehicle surrounding and a vehicle communication system status,
        a processing unit connected to at least one memory unit configured to store sensor data, and
        a control arrangement configured to control steering and velocity of the host vehicle based on information received from the sensors; and
    a positioning system configured to determine a host vehicle position and driving direction;
    wherein the vehicle system is configured to determine, by the processing unit, at least one of an estimated probability that at least one sensor will become unavailable, and an estimated time or distance ahead until at least one sensor is determined to become unavailable, the determination being based on at least one of a detected host vehicle condition or a detected host vehicle surrounding condition, detected by at least one of the plurality of sensors, and host vehicle surrounding condition information stored in the memory unit;
    wherein the vehicle system further is configured to activate, by the autonomous drive arrangement, at least one first countermeasure based on at least one of the estimated probability, the estimated time and the estimated distance.

2. The vehicle system according to claim 1 wherein the vehicle system is configured to activate, by the autonomous drive arrangement, at least one first countermeasure if the estimated probability that at least one sensor will become unavailable exceeds a threshold probability or if the estimated time or distance ahead until at least one sensor is determined to become unavailable is below a threshold level.

3. The vehicle system according to claim 1 wherein the plurality of sensors is configured to provide detected information on the host vehicle surrounding to the memory unit, such that detected vehicle surrounding information on routes driven by the host vehicle is accessible during subsequent driving on the same routes.

4. The vehicle system according to claim 1 wherein the activation of at least one countermeasure is based on a detected host vehicle surrounding condition, detected by at least one of the plurality of sensor, in a form of sun-light negatively affecting a vehicle camera sensor.

5. The vehicle system according to claim 1 wherein the activation of at least one countermeasure is based on host vehicle surrounding condition information stored in the memory unit, the information being related to a sun position.

6. The vehicle system according to claim 5 wherein the activation of at least one countermeasure is based on stored information related to a sun position combined with information on the host vehicle driving direction received from the positioning system.

7. The vehicle system according to claim 1 wherein the activation of at least one countermeasure is based on a detected host vehicle surrounding condition, detected by at least one of the plurality of sensors, in a form of a weather condition negatively affecting at least one of a camera sensor, a radar sensor and a lidar sensor.

8. The vehicle system according to claim 1 further comprising a communication system configured for communication between the host vehicle and external communication arrangements, wherein the host vehicle is configured to receive data relating to host vehicle surrounding conditions from the external communication arrangements.

9. The vehicle system according to claim 1 further comprising a navigation system configured to provide the autonomous drive arrangement with information on available routes in a road network surrounding the host vehicle and to allow a vehicle operator to input a preferred route.

10. The vehicle system according to claim 8 wherein the activation of at least one countermeasure is based on a detected decreased communication capacity, detected by at least one of the plurality of sensors, between the host vehicle and at least one external communication arrangement.

11. The vehicle system according to claim 8 wherein the activation of at least one countermeasure is based on a host vehicle surrounding condition information indicative of a communication capacity in a predefined geographical area.

12. The vehicle system according to claim 1 wherein a sensor is determined to be unavailable if a sensor performance level is below a threshold sensor performance level, and wherein at least one first countermeasure is activated only if the sensor is determined to be unavailable for a duration of time that exceeds a threshold duration of time.

13. The vehicle system according to claim 1 wherein the vehicle system is configured to activate the at least first countermeasure, the countermeasure selected from a host vehicle operator alert indicative of an upcoming reduced autonomous driving capacity, a disablement of one or more autonomous drive functions, a generation of an alternatively route to a previously selected preferred route, an increase of safety distance to at least one object in the vehicle surrounding, a change of vehicle velocity, a stop of the host vehicle, and activation of dead reckoning.

14. A vehicle comprising a vehicle system according to any one of claim 1.

15. A method for increasing at least one of safety and comfort during autonomous driving of a host vehicle including a vehicle system, the vehicle system comprising an autonomous drive arrangement comprising a plurality of sensors configured to monitor at least one of a vehicle surrounding and a vehicle communication system status, a processing unit connected to at least one memory unit configured to store sensor data, and a control arrangement configured to control steering and velocity of the host vehicle based on information received from the sensors, the vehicle system further comprising a positioning system configured to determine a host vehicle position and driving direction, the method comprising:
- determining, by the processing unit, at least one of the estimated probability that at least one sensor will become unavailable and the estimated time or distance ahead until at least one sensor is determined to become unavailable, the determination being based on at least one of a detected host vehicle condition or a detected host vehicle surrounding condition, detected by at least one of the plurality of sensors, and host vehicle surrounding condition information stored in the memory unit; and
- activating, by the autonomous drive arrangement, at least one first countermeasure based on at least one of the estimated probability, the estimated time and the estimated distance.

* * * * *

UNITED STATES PATENT AND TRADEMARK OFFICE
CERTIFICATE OF CORRECTION

PATENT NO. : 9,731,729 B2
APPLICATION NO. : 14/644405
DATED : August 15, 2017
INVENTOR(S) : Stefan Solyom et al.

It is certified that error appears in the above-identified patent and that said Letters Patent is hereby corrected as shown below:

In the Claims

Column 16, Line 7, Claim 4:
After "one of the plurality of"
Delete "sensor" and
Insert -- sensors --.

Column 16, Line 55, Claim 13:
After "a generation of an"
Delete "alternatively" and
Insert -- alternative --.

Signed and Sealed this
Fourteenth Day of November, 2017

Joseph Matal
*Performing the Functions and Duties of the
Under Secretary of Commerce for Intellectual Property and
Director of the United States Patent and Trademark Office*